US010197023B2

(12) United States Patent
Pearce et al.

(10) Patent No.: US 10,197,023 B2
(45) Date of Patent: Feb. 5, 2019

(54) SADDLE FUEL TANK

(71) Applicant: Ford Global Technologies, LLC, Dearborn, MI (US)

(72) Inventors: Russell Randall Pearce, Ann Arbor, MI (US); Scott A. Bohr, Novi, MI (US); Mohammad R. Aghili, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/354,121

(22) Filed: Nov. 17, 2016

(65) Prior Publication Data

US 2018/0135574 A1 May 17, 2018

(51) Int. Cl.
| | | |
|---|---|---|
| *F02M 37/00* | (2006.01) | |
| *B60K 15/03* | (2006.01) | |
| *F02M 37/18* | (2006.01) | |
| *F02D 33/00* | (2006.01) | |
| *F02M 37/14* | (2006.01) | |
| *F02M 37/22* | (2006.01) | |

(52) U.S. Cl.
CPC ......... *F02M 37/0094* (2013.01); *B60K 15/03* (2013.01); *F02D 33/003* (2013.01); *F02M 37/14* (2013.01); *F02M 37/18* (2013.01); *F02M 37/22* (2013.01)

(58) Field of Classification Search
CPC .... F02M 37/0094; F02M 37/14; F02M 37/18; F02M 37/22; B60K 15/03; F02D 33/003
USPC ............ 123/509; 137/255, 262, 574, 565.29, 137/565.33, 508, 544, 551, 355; 60/283; 180/69.4; 220/562, 567.2, 4.14, 4.15
See application file for complete search history.

(56) References Cited

U.S. PATENT DOCUMENTS

| | | | | |
|---|---|---|---|---|
| 2,953,156 A | * | 9/1960 | Bryant ................. | B60K 15/077 137/263 |
| 3,083,720 A | * | 4/1963 | Cartwright ............ | B65D 90/00 137/142 |
| 3,917,117 A | * | 11/1975 | Plotsky ................. | B65D 88/62 222/386.5 |
| 4,651,701 A | * | 3/1987 | Weaver ................ | F02M 37/103 123/497 |
| 5,040,516 A | * | 8/1991 | Haraguchi ........... | B60K 15/061 123/509 |
| 5,056,492 A | * | 10/1991 | Banse .................... | B60K 15/01 123/509 |
| 5,078,169 A | * | 1/1992 | Scheurenbrand .... | B60K 15/073 137/571 |
| 5,237,977 A | * | 8/1993 | Tuckey ................ | B60K 15/077 123/510 |
| 5,435,345 A | * | 7/1995 | Robinson ............... | F02M 69/54 123/514 |

(Continued)

*Primary Examiner* — Thomas Moulis
*Assistant Examiner* — John Bailey
(74) *Attorney, Agent, or Firm* — Julia Voutyras; McCoy Russell LLP

(57) ABSTRACT

Methods and systems are provided for a fuel tank mounted to a vehicle. Specifically, a saddle fuel tank comprising of a primary and secondary fuel compartment, each compartment having a module for mounting a fuel pump, fuel sensor and other accessories is disclosed. A first and second crimped opening formed on a top external wall and bottom internal wall, respectively of the saddle fuel tank may provide means for securely mounting a main and sub-side module to the fuel tank.

20 Claims, 7 Drawing Sheets

(56) References Cited

U.S. PATENT DOCUMENTS

| | | | | |
|---|---|---|---|---|
| 5,839,484 A * | 11/1998 | Engle | A01J 7/00 | 141/65 |
| 5,901,742 A * | 5/1999 | Kleppner | F02M 69/54 | 137/508 |
| 5,931,388 A * | 8/1999 | Loebenfelder | F02M 45/083 | 239/533.15 |
| 6,283,142 B1 | 9/2001 | Wheeler et al. | | |
| 6,332,555 B1 * | 12/2001 | Stangier | B60K 15/03177 | 220/319 |
| 6,357,618 B1 * | 3/2002 | Kloess | B60K 15/03177 | 220/319 |
| 6,371,153 B1 | 4/2002 | Fischerkeller et al. | | |
| 6,533,288 B1 * | 3/2003 | Brandner | B60K 15/03 | 220/304 |
| 6,553,973 B1 * | 4/2003 | Coha | B01D 29/606 | 123/509 |
| 6,691,888 B2 * | 2/2004 | Moser | B60K 15/03 | 220/562 |
| 6,712,234 B2 | 3/2004 | Boecker | | |
| 6,755,219 B1 * | 6/2004 | Bolle | B01J 7/02 | 141/100 |
| 6,851,396 B2 * | 2/2005 | Fromont | B60K 15/00 | 123/1 A |
| 6,871,640 B2 * | 3/2005 | Atwood | F02M 37/0023 | 123/509 |
| 6,899,248 B2 * | 5/2005 | Reinelt | B60K 15/03177 | 220/4.13 |
| 6,955,158 B2 * | 10/2005 | Rumpf | B60K 15/077 | 123/509 |
| 7,013,878 B1 * | 3/2006 | Cotton | F02M 37/20 | 123/41.31 |
| 7,069,913 B1 * | 7/2006 | Crary | F02M 37/0052 | 123/509 |
| 7,124,748 B2 * | 10/2006 | Gaffield | F02M 37/0094 | 123/509 |
| 7,216,635 B1 * | 5/2007 | Roche | F02M 37/20 | 123/198 D |
| 7,284,540 B2 * | 10/2007 | Attwood | F02M 37/0094 | 123/509 |
| 7,784,637 B2 * | 8/2010 | Osborne | F16J 15/025 | 220/562 |
| 8,701,705 B2 * | 4/2014 | Park | F02D 33/003 | 123/509 |
| 8,739,821 B2 * | 6/2014 | Murabayashi | B60K 15/077 | 123/509 |
| 8,944,267 B2 | 2/2015 | Amidon et al. | | |
| 9,499,048 B2 * | 11/2016 | Thirlaway | B60K 15/03 | |
| 2004/0182454 A1 * | 9/2004 | Atwood | F02M 37/0023 | 137/574 |
| 2004/0244780 A1 * | 12/2004 | Kempka | F02M 37/10 | 123/509 |
| 2005/0045159 A1 * | 3/2005 | Honda | B60K 15/077 | 123/509 |
| 2005/0284220 A1 * | 12/2005 | Cotton | B29C 45/14311 | 73/322.5 |
| 2006/0060250 A1 * | 3/2006 | Benzin | F02M 37/0023 | 137/565.29 |
| 2006/0260587 A1 * | 11/2006 | Woody | F02M 5/14 | 123/517 |
| 2006/0266338 A1 * | 11/2006 | Kashima | B60K 15/03504 | 123/519 |
| 2007/0062492 A1 * | 3/2007 | Attwood | F02M 37/025 | 123/509 |
| 2007/0065314 A1 * | 3/2007 | Nagata | F02M 37/048 | 417/423.1 |
| 2008/0197578 A1 * | 8/2008 | Osborne | F16J 15/025 | 277/590 |
| 2008/0302339 A1 * | 12/2008 | Krogull | B60K 15/03504 | 123/516 |
| 2009/0151699 A1 * | 6/2009 | Honda | F02M 37/0058 | 123/457 |
| 2009/0218155 A1 * | 9/2009 | Morikawa | B62J 35/00 | 180/225 |
| 2011/0011373 A1 * | 1/2011 | Shimura | F02D 41/3082 | 123/497 |
| 2011/0131789 A1 * | 6/2011 | Pohlmann | B29C 49/20 | 29/525.06 |
| 2011/0297260 A1 * | 12/2011 | Mason | F04F 5/10 | 137/565.29 |
| 2012/0228857 A1 * | 9/2012 | Karube | B62J 35/00 | 280/835 |
| 2012/0234302 A1 * | 9/2012 | Shimura | F02M 25/089 | 123/521 |
| 2014/0110416 A1 * | 4/2014 | Watson | B60K 15/01 | 220/601 |
| 2015/0061276 A1 * | 3/2015 | Nishida | B62J 35/00 | 280/835 |
| 2015/0090512 A1 * | 4/2015 | Inoue | B62J 35/00 | 180/219 |
| 2015/0369259 A1 * | 12/2015 | Park | F04F 5/24 | 137/544 |
| 2017/0166048 A1 * | 6/2017 | Saeki | B60K 15/063 | |
| 2017/0298879 A1 * | 10/2017 | Ishiyama | B60K 15/063 | |

* cited by examiner

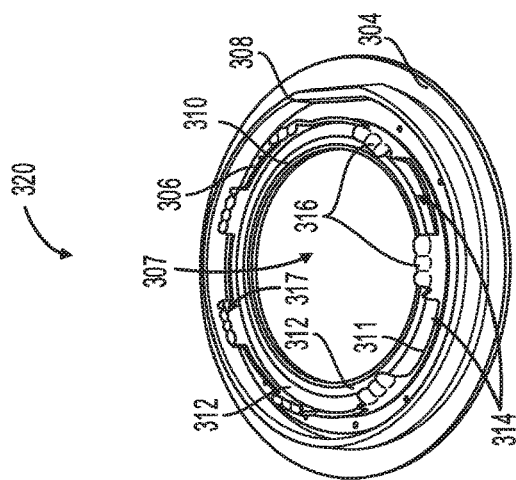
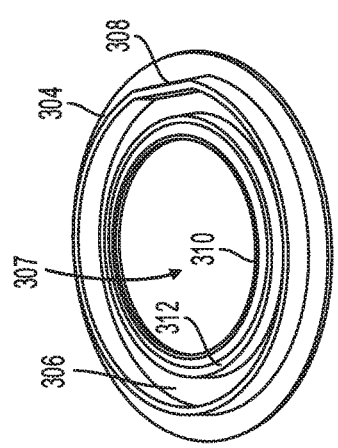
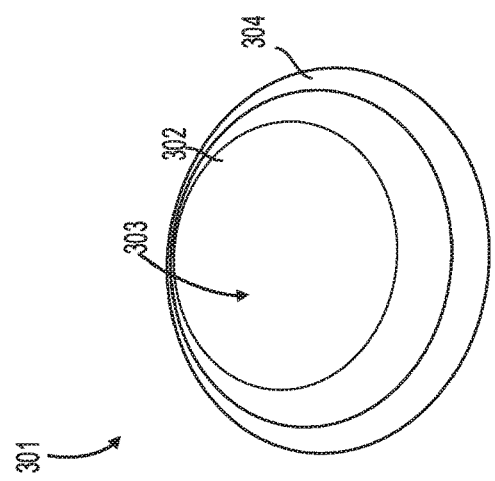

SADDLE FUEL TANK

FIELD

The present description relates generally to methods and systems for a fuel tank mounted to a vehicle.

BACKGROUND/SUMMARY

A saddle fuel tank may be configured to fit in a space between different components of a vehicle such as motor shaft, transmission shaft and exhaust pipe, for example, and may be used in all-wheel drive (AWD) and high performance rear wheel drive (RWD) vehicles. The saddle tank may be divided into a primary and secondary compartment. The primary compartment houses a main module where a main fuel pump and a primary fuel level sensor may be attached. The main fuel pump delivers fuel to an engine and the primary fuel sensor measures the fuel level in the fuel tank. The secondary compartment provides a housing for a subside module that may comprise a secondary fuel pump and fuel sensor. The secondary fuel pump transfers fuel from the secondary compartment via a flexible tubing to the primary compartment, while the secondary fuel sensor measures the fuel level in the secondary compartment.

Mounting of the main module and subside module inside the fuel tank can be a challenge, especially in a fuel tank comprised of stainless steel or other hard metal materials.

An example saddle fuel tank is disclosed by Park in U.S. Pat. No. 8,701,705 B2. Therein, the fuel tank comprises a primary module mounted inside a main chamber, with a top end of the module held by a first flange mounted to a top external wall of the fuel tank, and a secondary module mounted inside a sub-side chamber by attaching a second flange to the top external wall, and fixing a bottom portion of the second module to a bottom internal wall of the fuel tank.

However, the inventors have recognized potential issues with such a saddle fuel tank design. For example, both the primary and secondary module may be mounted with a flange assembly having complex components which may be difficult to manufacture. Furthermore, the components of the flange assembly may require frequent maintenance, which may cause inconvenience, and may increase operating costs.

The inventors herein have developed a saddle fuel tank to address some of issues noted above. In one example, a saddle fuel tank comprises: a main module mounted inside a first chamber, where a top end of the module is held by a flange that fits into a crimped opening on a top external wall of the fuel tank; and a sub-side module mounted inside a secondary chamber with a flange that fits into a crimped region on a bottom inside wall of the secondary chamber to secure the subside module.

In this way, the main and sub-side modules may be mounted inside a non-serviceable fuel tank using mechanical crimps to reduce frequent maintenance and provide easier manufacturing. For example, the top portion of the main module may be held by a circular flange designed to fit into the first crimped opening on the top external wall of the fuel tank. The sub-side module may be mounted inside the second crimped opening in the bottom wall of the secondary chamber. By securing the main and subside modules to the fuel tank using mechanical crimps, simplified securing of the modules to the fuel tank is provided to reduce maintenance of fuel tank components. Further by using an approach with more commonality between both modules, manufacturing can be simplified and processes re-used.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a fuel tank bubble used for crimping an opening for a top and bottom flange used for securing a main module and sub-side module, respectively to the fuel tank.

FIG. 3B shows a first pocket formed in the fuel tank bubble during formation of a first crimped opening for the top flange used for securing the main module to the fuel tank.

FIG. 3C shows a first retaining ring disposed in the first pocket of the first crimped opening for the top flange of the fuel tank.

FIGS. 1-5 are shown approximately to scale, although other relative dimensions may be used, if desired.

DETAILED DESCRIPTION

The following description relates to systems and methods for a fuel tank mounted to a vehicle. Specifically, a saddle fuel tank comprising a primary and secondary fuel compartment, each compartment having a module for mounting a fuel pump or with a fuel pump mounted therein, sensors and other accessories, is disclosed.

Figure 1:
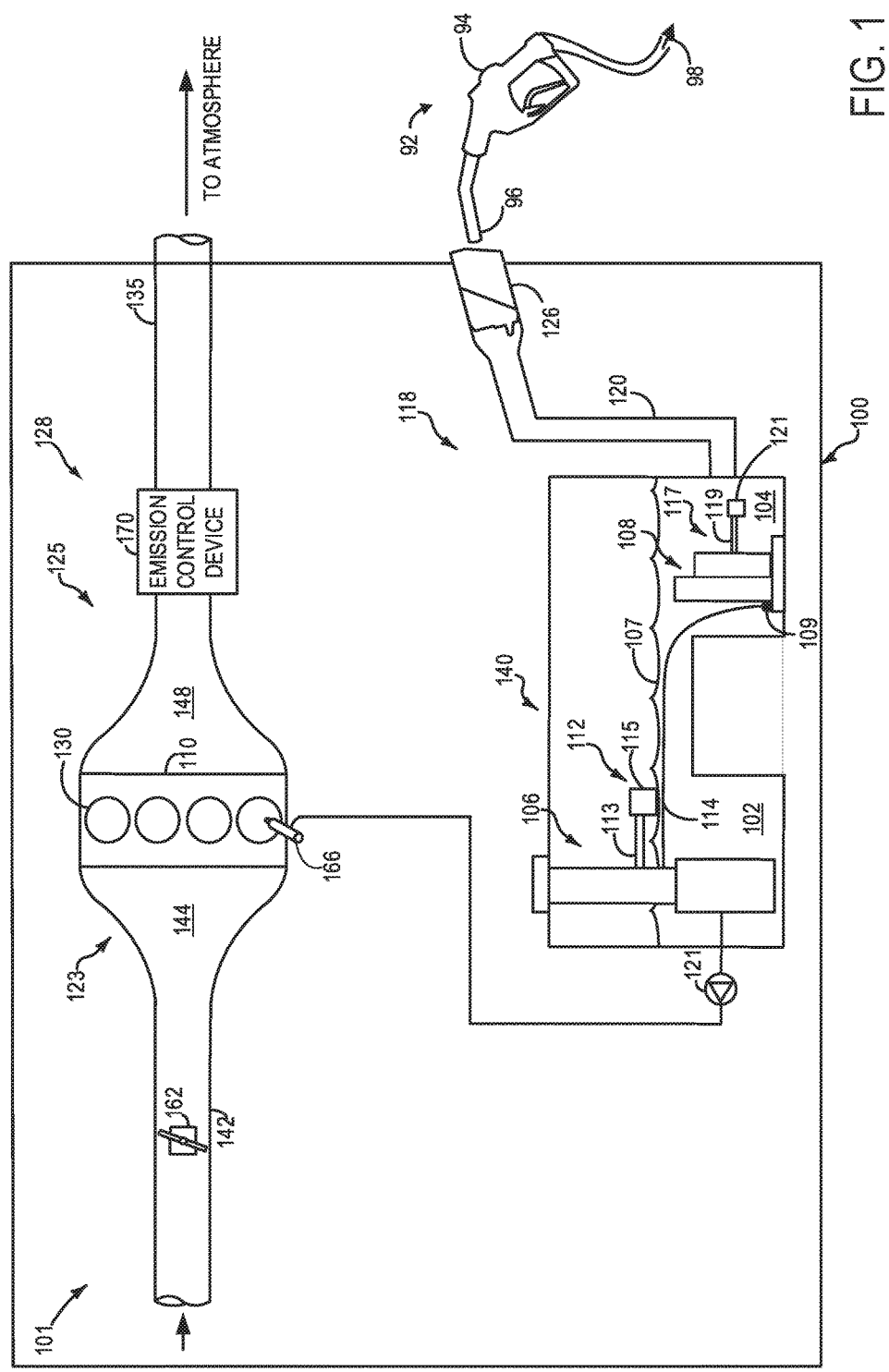
FIG. 1 shows a saddle fuel tank connected to a vehicle engine.
Figure 2:
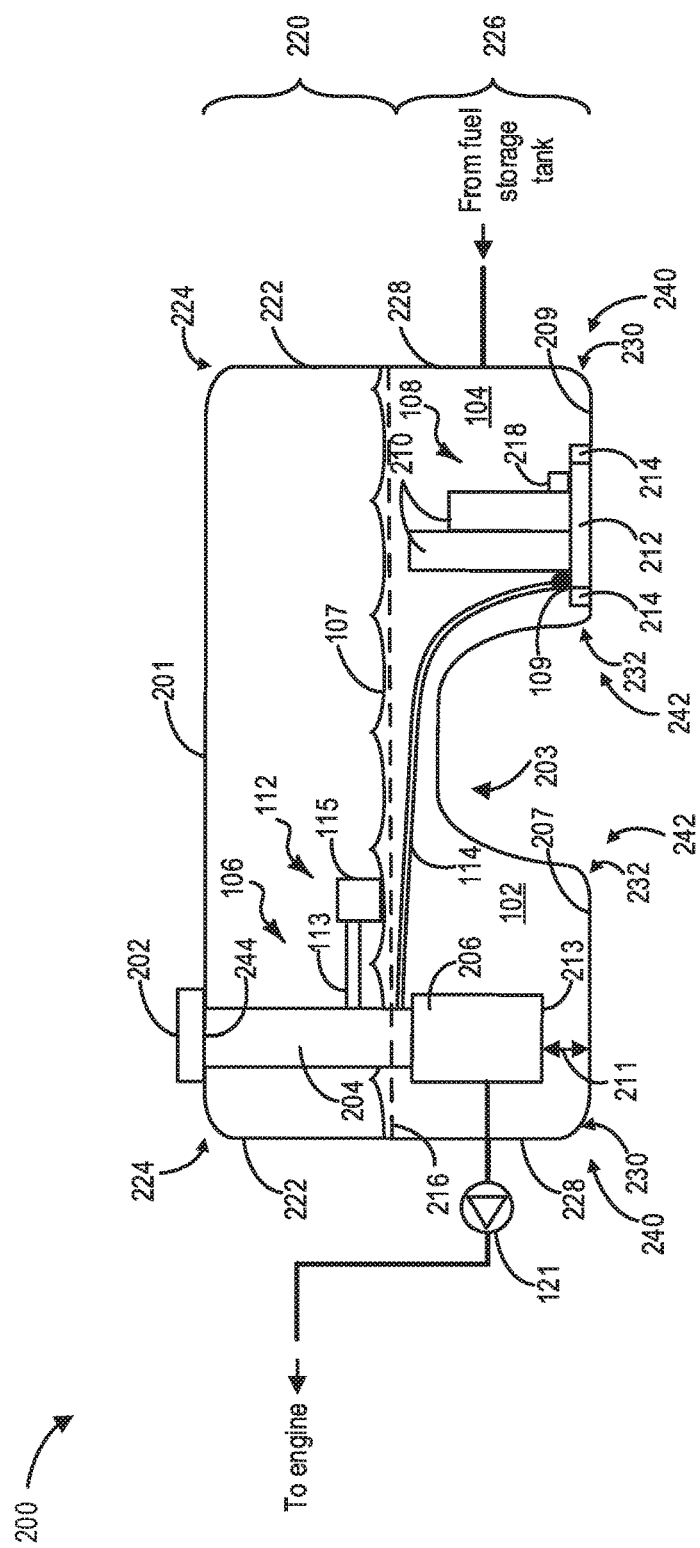
FIG. 2 shows a saddle fuel tank comprising a primary and secondary chamber, each compartment having a module for mounting a fuel pump, sensors and other accessories.
Figure 5:
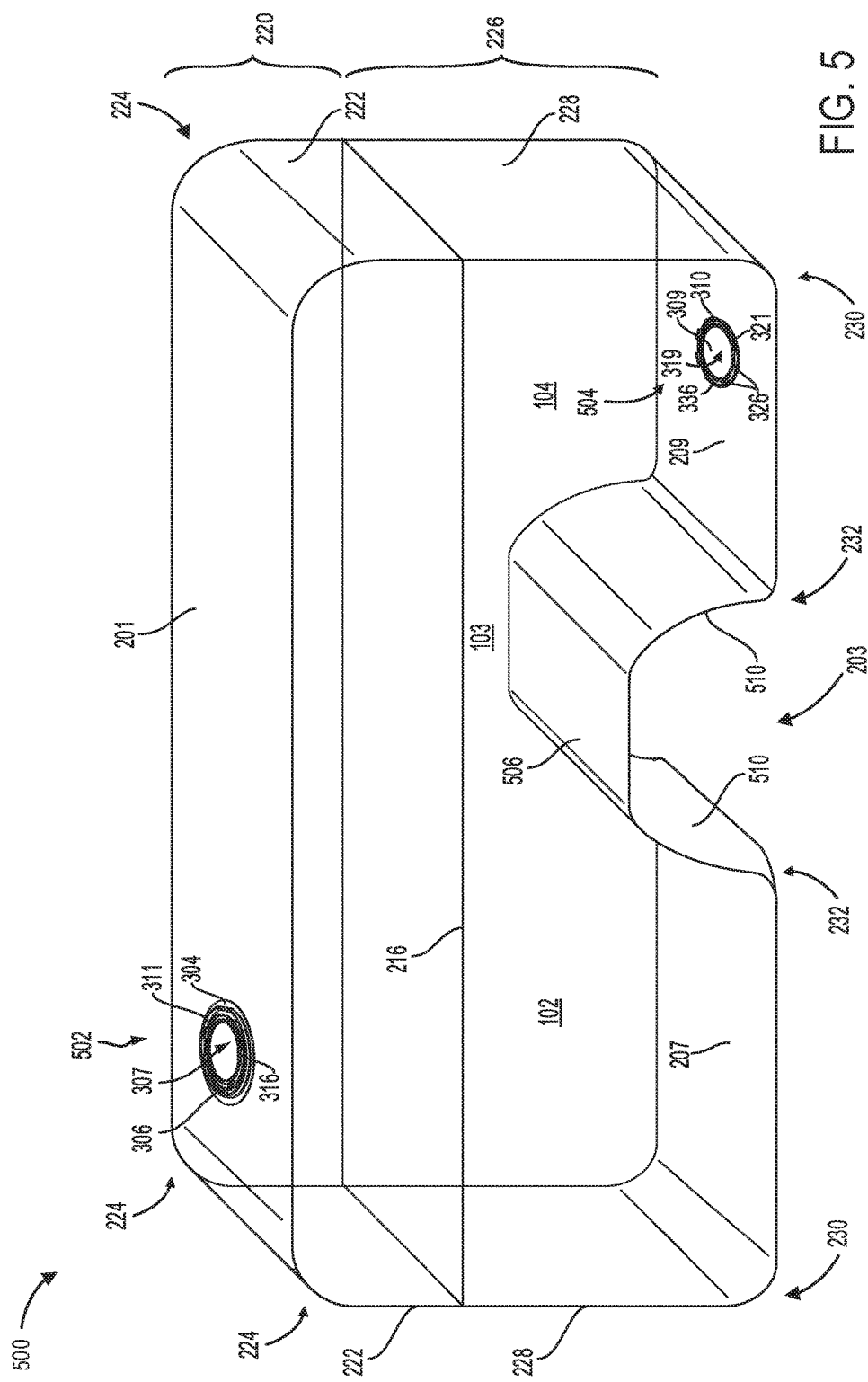
FIG. 5 shows an example saddle fuel tank having crimped openings on the top and bottom wall of the fuel tank to secure the main and sub-side module, respectively to the fuel tank.
Figure 6:
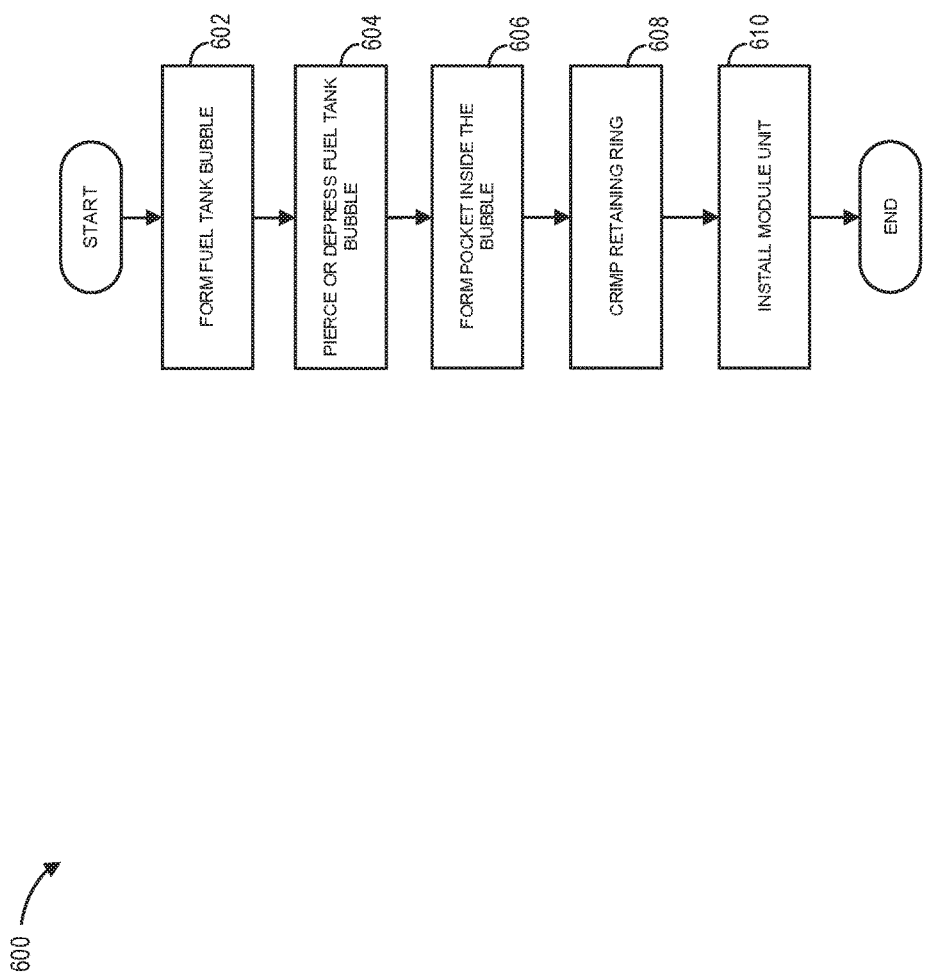
FIG. 6 shows an example process for crimping openings on the top and bottom wall of the fuel tank to secure the main and subside module, respectively to the fuel tank.

FIG. 1 shows an example vehicle system including an engine coupled to the saddle fuel tank and a fueling system. The saddle fuel tank may be configured with a bottom recessed portion that allows the fuel tank to be mounted in a space on the vehicle such as above a transmission shaft or exhaust pipe, for example. FIG. 2, shows an example saddle fuel tank having a top and bottom portion, joined together to form a tight enclosure. As an example, the top portion may be securely attached to the bottom portion via a permanent weld along a contact plane formed between the top and bottom portions. The saddle fuel tank may include a primary and secondary chamber, and the recessed bottom portion separating the primary chamber from the secondary chamber. The saddle fuel tank may be provided on the vehicle system, such as shown in FIG. 1, and may be adapted to store gasoline, diesel or other fuel blends dispensed from a fuel dispensing system. FIGS. 3A-3F, show an example procedure of crimping openings in the top and bottom wall of the saddle fuel tank. The crimped openings may be used to mount a main module and subside module inside the fuel tank. The main and sub-side modules may be secured to the fuel tank using a locking ring shown in FIG. 4, in conjunction with a first and second retaining ring disclosed with reference to FIGS. 3C and 3F. FIG. 5, shows a three dimensional schematic of the saddle fuel tank. The top portion of the fuel tank may be joined with the bottom portion via a permanent weld or a suitable fastener. FIG. 6, shows an example method for forming a first and second crimped openings on the top and bottom wall, respectively of the saddle fuel tank. The first crimped opening on the top wall provides a means for attaching the main module to the primary chamber of the saddle fuel tank. Similarly, the second crimped opening in the bottom wall allows the sub-side module to be securely attached to the secondary chamber of the saddle fuel tank.

Turning to FIG. 1, an example vehicle system 100 shows an engine system 101 coupled to a fuel system 118. In some examples, engine system 101 may be a gasoline engine. However, in other examples, engine system 101 may be a different type of engine system such as a diesel engine or a dual fuel type engine that may be fueled with gasoline and an alcohol fuel blend. The vehicle may include body sheet material, such as sheet metal. Further, although not shown, vehicle 100 may further include a transmission, cab, or other components.

The engine system 101 includes an engine block 110 having a plurality of cylinders 130. The engine system 101 may also include an engine intake 123 and an engine exhaust 125. The engine intake 123 includes a throttle 162 fluidly coupled to an engine intake manifold 144 via an intake passage 142. The engine exhaust 125 includes an exhaust manifold 148 leading to an exhaust passage 135 that routes exhaust gas to the ambient atmosphere. The engine exhaust 125 may include one or more emission control devices 170, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 118 includes a fuel tank 140 having a primary chamber 102 and a secondary chamber 104. For example, fuel tank 140 may store one or more liquid fuels, including diesel, gasoline, alcohol fuel blends etc. A main module 106 mounted in the primary chamber of the saddle fuel tank may include a fuel level sensor 112 for measuring a fuel level inside the tank. For example, fuel level sensor 112 may include an arm 113 coupled to a float 115. In this example, the position of the float 115 on a top surface 107 of a fuel volume may be used to determine the fuel level in the saddle tank. The main module may be coupled to a fuel pump system 121 that conveys fuel to the engine cylinders. A subside module mounted in a bottom internal wall of the secondary chamber of the fuel tank may include a secondary fuel pump, fuel level sensor and other accessories. As an example, fuel tank 140 may include accessories such as a temperature sensor, fuel tubes, filters and other accessories. The fuel level sensor 117, may be used to determine an amount of fuel in the secondary chamber of the fuel tank. For example, fuel level sensor 117 may include an arm 119 coupled to a float 115. In one example, a horizontal position of the float 115 on a top surface of a fuel volume (not shown) in the secondary chamber, may be used to determine a fuel level in the secondary chamber.

A flexible tube 114 connected to a filter 109, may convey fuel from the secondary chamber 104 to the main module 106 in the primary chamber 102, where the fuel is further conveyed to the engine via the fuel pump system 121. As an example, the fuel pump system 121 may include one or more pumps for pressurizing fuel delivered to the injectors of engine system 101, such as the example injector 166 shown. While only a single injector 166 is shown coupled to the engine, additional injectors are provided for each cylinder. It will be appreciated that fuel system 118 may be a return-less fuel system, a return fuel system, or various other types of fuel system.

A fuel filler passage 120 may be coupled to fuel tank 140 to direct fuel into the fuel tank during refueling. A fueling mechanism 126 may be coupled to fuel filler passage 120. As described in more detail below, the refueling mechanism may include a nozzle chamber that partially penetrates an outer surface of vehicle 100 so that fuel may be replenished into the fuel tank via an external fuel source at a location shown by arrow 98. For example, fuel may be replenished in fuel tank 140 via fuel dispensing device 92 having a handle 94 and nozzle 96 at a refueling pump station. Details of the fuel tank are described further with reference to FIGS. 2-5.

In this way, the system of FIG. 1 provides the saddle fuel tank 140, comprising: the main module 106 disposed inside the primary chamber 102, and the subside module 108 mounted in the secondary chamber 104; the secondary chamber 104 fluidly connected to the primary chamber 102 via the flexible tube 114.

Turning to FIG. 2, an example saddle fuel tank 200 comprising a top portion 220 and a bottom portion 226 is shown. The top portion may be joined with the bottom portion along contact plane 216. As an example, the top portion may be securely attached to the bottom portion via a permanent weld along the contact plane 216. In other examples, the top portion may be securely fastened to the bottom portion using other suitable methods. The saddle fuel tank 200 may be provided on a vehicle system, such as shown in FIG. 1, and may be adapted to store gasoline, diesel or other fuel blends dispensed from a fuel dispensing system. The saddle fuel tank 200 may be configured with a recessed portion 203 that allows the fuel tank to fit in a space in the vehicle such as over a transmission shaft or an exhaust pipe. As an example, a body forming the saddle fuel tank 200 may be comprised of stainless steel. In other examples, the saddle fuel tank 200 may be comprised of other suitable materials such as a single or multi-layer high-density polyethylene (HDPE) and low carbon steel.

As shown, the top portion 220 of the saddle fuel tank includes a top wall 201 and a side wall 222, with a top curved surface 224 connecting each top wall 201 to the side wall 222. The bottom portion 226 includes a first bottom wall 207 and second bottom wall 209, the first and second bottom wall separated by a concave recessed portion 203. Each of the first and second bottom wall join the recessed portion 203 at an inner junction 242 formed by an inner curved surface 232. An outer curved surface 230 forms an outer junction 240 of each of the first and second bottom wall. As an example, the curved surface 230 connects each of the first and second bottom wall to each side wall 228 of the bottom portion 226. The saddle fuel tank 200 includes a primary chamber 102 and a secondary chamber 104, separated by the concave recessed portion 203.

The primary chamber 102 contains a main module 106 comprising a top flange 202, cylindrical middle section 204 and a cylindrical bottom section 206. As an example, the main module may be mounted inside the primary chamber by securely fastening the top flange to a first crimped opening 244 in the top external wall 201. When mounted, the bottom section 206 of the main module 106 forms a gap 211 between a distal end 213 of the main module 106 and the first bottom wall 207. Details on formation of crimped openings in the saddle fuel tank 200 is further disclosed with reference to FIGS. 3A-3F. A fuel level sensor 112, attached to the middle section 204 of the main module 106, may be used to measure a fuel level within the fuel tank. For example, fuel level sensor 112 may include a horizontally extended arm 113 coupled to a float 115 to measure a fuel volume in the saddle fuel tank 200. In one example, a position of the float 115 on a top surface 107 of the fuel volume may be used to determine the fuel level in the fuel tank. The main module 106 may be coupled to a fuel pump system 121 to convey fuel from the saddle fuel tank 200 to the engine cylinders. As an example, the fuel pump system 121 may be mounted outside the saddle fuel tank 200. In another example, the fuel pump system 121 may be mounted inside the saddle fuel tank 200 forming an integral component of the main module 106; the fuel pump fluidly coupled to fuel injectors for delivering fuel to the engine cylinders. Also, other fuel tank accessories such as a temperature sensor and other sensors may be attached to the main module 106.

The secondary chamber 104 contains a sub-side module 108 comprising vertical columns 210, flat section 218 and a bottom flange 212 crimped into a slot formed on an internal surface of the second bottom internal wall 209 using a plurality of mechanical crimps 214 attached on a retaining ring mounted in a pocket formed in the slot. As an example, the slot in the bottom wall may be formed with an adequate diameter to fit the bottom flange 212, thereby securing the subside module 108 to the fuel tank 200. As an example, the sub-side module 108 may include a secondary fuel pump, fuel level sensor and other accessories. In one example, the sub-side module 108 may include accessories such as a temperature sensor, fuel lines, filters and other sensors.

A flexible tube 114 connected to a filter 109, mounted on top of the bottom flange 212, and pressurized by the secondary fuel pump, may convey fuel from the secondary chamber 104 to the primary chamber 102. As an example, flexible tube 114 may be configured with a diameter in a range of 6 mm to 12 mm to convey fuel from the secondary chamber 104 to the primary chamber 102 at flow rates in a range of 25 to 175 liters/hour. Subsequently, the fuel may be further conveyed to the engine via the pump system 121 having one or more pumps for pressurizing fuel delivered to injectors of the engine system. For example, a main pump attached to the main module 106 may deliver fuel from the primary chamber to engine cylinders at flow rates ranging from 25-250 liters/hour.

In this way, the saddle fuel tank 200 may comprise: a main module 106 mounted inside a first chamber 102, where a top end of the module is held by a top flange 202 that fits into a crimped opening 244 on a top external wall 201 of the fuel tank; and a sub-side module 108 mounted inside a secondary chamber 104 with a bottom flange 212 that fits into a crimped region on a bottom inside wall 209 of the secondary chamber 104 to secure the sub-side module 108.

Figure 3F:
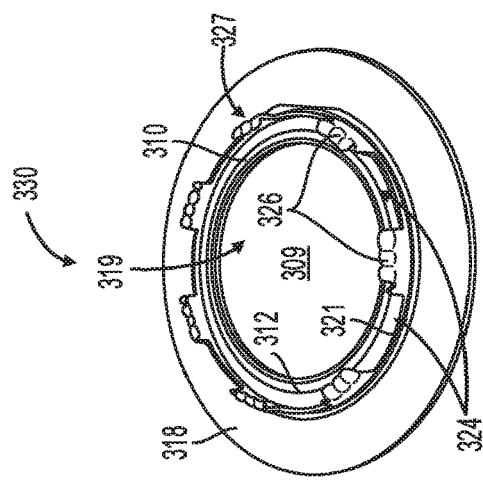
FIG. 3F shows the second crimped opening for securing the sub-side module to the fuel tank.
Figure 3E:
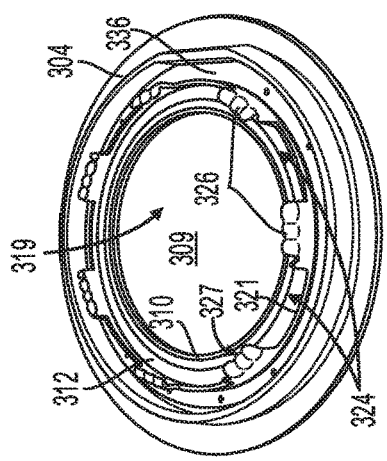
FIG. 3E shows a second retaining ring disposed in the second pocket of the second crimped opening for the bottom flange of the fuel tank.
Figure 3D:
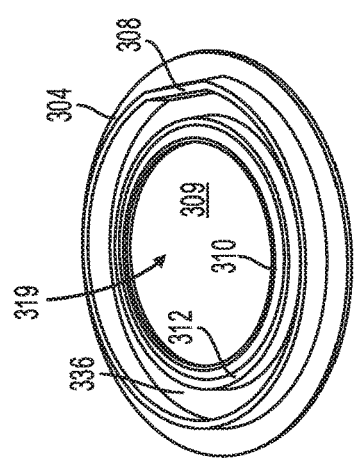
FIG. 3D shows a pocket formed in the fuel tank bubble during formation of a second crimped opening for a bottom flange used for securing a subside module to the fuel tank.

Referring to FIGS. 3A-3F, an example procedure for forming a first crimped opening 320 and a second crimped opening 330, in a top and bottom wall respectively of a saddle fuel tank (e.g., top wall 201 and bottom wall 209 of saddle fuel tank 200 shown in FIG. 2) is disclosed. The first and second crimped opening may be used to mount a main module and sub-side module, respectively to the saddle fuel tank, such as the main module 106 and sub-side module 108 mounted inside the saddle fuel tank 200 shown in FIG. 2. As shown in FIG. 3A, crimping an opening in a top and bottom wall of the saddle fuel tank involves forming a tank bubble 301 at selected locations on the top and bottom walls of the fuel tank. As an example, the first crimped opening 320 in the top wall of the saddle fuel tank may be formed in a first chamber (such as primary chamber 102 of saddle fuel tank 200 shown in FIG. 2) of the fuel tank while the second crimped opening 330 may be formed on the bottom internal wall of the secondary chamber (such as secondary chamber 104 of saddle fuel tank 200 shown in FIG. 2). The tank bubble 301 may be a circular elevated disc having a top circular surface 302, a central surface 303 and an outer surface 304. As an example, the tank bubble 301 may be extruded or drawn from a portion of the top and bottom walls of fuel tank where the first and second crimped opening will be formed.

The first crimped opening 320 in the top wall may be formed by piercing a central surface 303 of the tank bubble to form a first aperture 307 and a first pocket 306 as shown in FIG. 3B. As an example, the first crimped opening 320 may be formed by cutting out the central section of the tank bubble 301 to provide the first aperture 307 with a diameter larger than a middle portion of the main module mounted inside the saddle fuel tank. In this case, the first aperture 307 may be larger enough to accommodate the middle section of the main module, which may be extended through the first crimped opening 320 from inside the fuel tank, to a couple to a top flange (such as top flange 202 shown in FIG. 2). In one example, the top flange forms an integral component of the main module. An inner rim surface 310 defines an inner edge of the first crimped opening 320, while an inner elevated circular edge 312 forms an inner circular boundary of the first pocket 306. An outer elevated circular edge 308 forms an outer circular boundary of the first pocket 306, which quickly tapers off beyond the elevated edge 308 of the first pocket 306.

Further, a first retaining ring 311 having a plurality of mechanical crimps 316 with a curved top portion 313, may be mounted in the first pocket 306 as shown in FIG. 3C. As an example, the first retaining ring 311 is mounted inside the first pocket 306, with the curved top portion 317 of the mechanical crimps 316 pointing inward towards a center of the first aperture 307. The first retaining ring 311 may include a plurality of slots 314 formed between each pair of mechanical crimps 316. In another example, the inner rim surface 310 and inner elevated circular edge 312 may remain exposed to form contact surfaces of the first crimped opening 320 when the first retaining ring 311 is mounted inside the first pocket 306. In this way, the top flange may be coupled to the first crimped opening 320, with surfaces of the flange touching or in face-sharing contact with the inner exposed surfaces of the first crimped opening 320, to form a tight coupling. As an example, a central inner section of the top flange may couple to a top end of the main module when mounted inside the saddle fuel tank. A first locking ring may be mounted to the top flange coupled to the first crimped opening 320. In this case, the top flange of the main module may be sandwiched the between the first locking ring and the first retaining ring 311, thereby securing the main module to the saddle fuel tank. When mounted on a top surface of the top flange, the mechanical crimps 316 on the first retaining ring 311 may extend through slots in the first locking ring. In this case, the top flange may be held tightly between the first locking ring and first retaining ring 311, due to a locking action of the mechanical crimps 316 retained in the slots on the first locking ring. The mechanical crimps 316 may be folded over the outer edges of the first locking ring and top flange to secure the main module to the fuel tank. Further, the first locking ring may be used to secure an outer cap to the top flange, thereby sealing the first crimped opening 320. Further details on the locking ring are disclosed further below with reference to FIG. 4.

Figure 4:
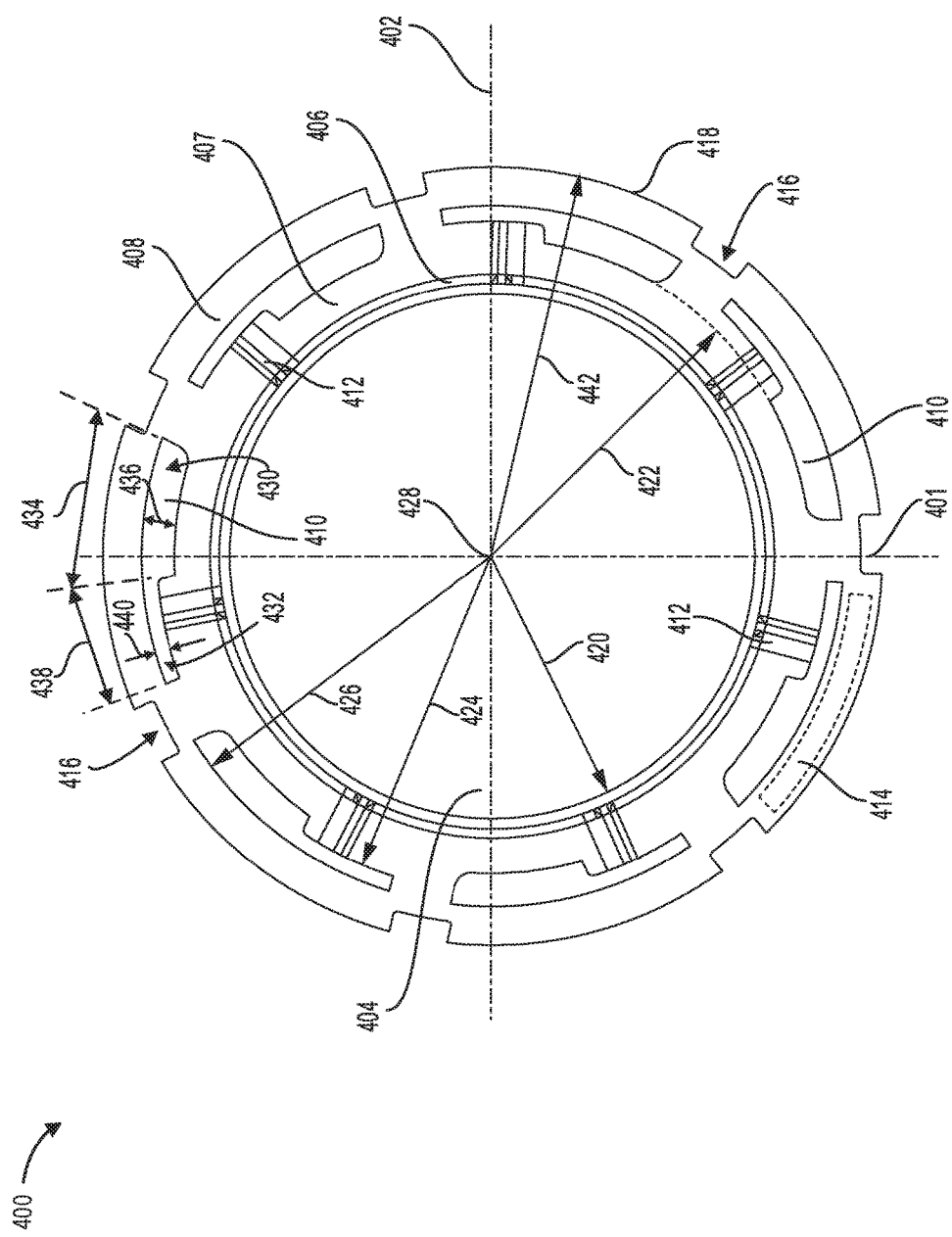
FIG. 4 shows a locking ring that couples to the first and second retaining ring of the first and second crimped openings, respectively of the fuel tank.

Referring to FIG. 4, a schematic depiction of a locking ring 400 for a crimped opening (such as opening 320 shown in FIG. 3C) in the saddle fuel tank is disclosed. The crimped opening may be used to mount the main and subside module (e.g., main module 106 and subside module 108 shown in FIG. 2) to the fuel tank. The locking ring 400 may be mounted over a first retaining ring, such as retaining 311 shown in FIG. 3C, mounted to the crimped opening. In this way, the locking ring 400 may sandwich the top flange (e.g., top flange 202 shown in FIG. 2) of the main module between the locking ring and first retaining ring, thereby securely attaching the main module to the saddle fuel tank. Similarly, the locking ring 400 may sandwich the bottom flange (e.g., bottom flange 212 shown in FIG. 2) of the subside module between the locking ring and a second retaining ring (e.g., retaining ring 321 shown in FIG. 3E), to secure the sub-side module to the fuel tank. The locking ring 400 may include an aperture 404 surrounded by a rimmed surface 406, an outer surface 408 and a plurality of slots 410 formed adjacent to web sections 412. Further, the locking ring 400 may include a side slot 414, and a plurality of recessed slots 416 formed on a perimeter 418 of the locking ring. The locking ring 400 may have a vertical axis 401 and a horizontal axis 402.

As shown in FIG. 4, the aperture 404 of the locking ring 400 is a circular opening with a radius 420 sized to receive a cylindrical body, such as the top flange 202 or cylinders 210 of the bottom flange 212 shown in FIG. 2. The rimmed surface 406 surrounding the aperture 404, may extend outward and away from an inner surface 407, providing a means of retaining the cylindrical body within the aperture 404. As an example, a radius 420 of the aperture 404 may range from 30 mm to 90 mm. The slots 410 formed between the inner surface 407 and outer surface 408 of the locking ring 400, may be formed at a first radius 422, a second radius 424 and third radius 426 from a center 428 of the locking ring 400. As an example, the first radius 422 and the second radius 424 may range from 35 mm to 95 mm. In a further example, the third radius 426 may be larger than the first and second radii, and may range from 40 mm to 100 mm.

Each adjacent pair of slots 410 on the locking ring 400, may be equidistant from one another, for example. In another example, the adjacent pair of slots 410 on the locking ring 400, may be non-equidistant from each other. Each slot 410 on the locking ring 400 may have a first section 430 and a second section 432, smaller than the first section 430. The slots 410 on the locking ring 400 may be adequately sized to receive mechanical crimps (e.g., mechanical crimps 316 shown in FIG. 3C) formed on the retaining ring, such as the retaining 311 shown in FIG. 3C. The first section 430 of each slot 410, may have a first length 434 and a first width 436, while the second section 432 may have a second length 438 and a second width 440. As an example, the first length 434 and width 436 of the first section 430 may have adequate dimensions that allow easy coupling of the mechanical crimps (on the retaining ring) with the locking ring. Similarly, the second length 438 and width 440 of the second section 432 may have adequate dimensions that allow easy coupling of the retaining and locking rings. In this way, the each slot 410 of the locking ring 400 may be sized to receive mechanical crimps of different sizes. The locking ring 400 may have a radius 442, adequately sized to fit over the retaining ring. As an example, the radius of 442 of the locking ring 400 may range from 50 mm to 110 mm. The locking ring 400 may be provided in various sizes, thereby allowing the locking ring to couple to retaining rings of different sizes. In this way, the locking ring 400 may be used in conjunction with the retaining ring to securely attach the main and subside modules to the saddle fuel tank.

Turning back to FIG. 3A and FIGS. 3D-3F, the second crimped opening 330 in the bottom wall of the saddle fuel tank may be formed by pressing the central surface 303 of the tank bubble 301 downward to produce a second aperture 319 having a flat surface 309, and a second pocket 336 having similar features as the pocket 306 disclosed in FIG. 3B. The next step involves mounting a second retaining ring 321 having a plurality of mechanical crimps 326, inside the second pocket 336. As an example, the mechanical crimps 326 on the second retaining ring 321, may be upward extending crimps having a curved top portion 327. In one example, the mechanical crimps 326 on the second retaining ring 321, may be spaced apart forming a gap 324 between each pair of mechanical crimps 326. The second retaining ring 321 disposed in the second crimped opening 330 may differ from the first retaining ring 311 mounted to the first crimped opening 320. As an example, the second retaining ring 321 of the second crimped opening 330 may have a larger diameter compared to the first retaining ring 311 mounted in the first crimped opening 320. In another example, the diameter of the first and second retaining rings may range from 60 mm to 180 mm. In other examples, the first and second retaining ring of the first and second crimped opening, respectively may have similar features and dimensions. In alternative examples, the first retaining ring 311, configured with a plurality of equally spaced mechanical crimps 316 may be disposed in a first pocket 306 of the first crimped opening 320, and a second retaining ring 321 having similar features as the first retaining ring 311, may be disposed in the second pocket 336 of the second crimped opening 330. The first and second retaining ring may be essentially manufactured using a similar production process, for example.

When the second retaining ring 321 is mounted inside the second pocket 336 of the second crimped opening 320, the flat surface 309, inner rim surface 310 and inner elevated edge 312 may remain exposed, forming inner contact surfaces that touch inner surfaces of a bottom flange of a sub-side module (e.g., bottom flange 212 of sub-side module 108 shown in FIG. 2). The bottom flange may be inserted into the second crimped opening 330, with a central inner section of the bottom flange touching contact surfaces formed by the flat surface 309, inner rim surface 310 and inner elevated edge 312. The outer surfaces of the bottom flange may touch inner surfaces of the second retaining ring 321. As an example, the bottom flange may be mounted inside a recessed slot 319 defined the second retaining ring 321, and a second locking ring (e.g., locking ring 400 shown in FIG. 4) may be mounted on top of the bottom flange to secure the sub-side module to the fuel tank. As an example, the second locking ring may have a similar or different diameter compared to the first locking ring coupled to the first crimped opening 320. The bottom flange of the sub-side module may be sandwiched between the second locking ring and retaining ring 321, thereby securing the sub-side module to the fuel tank. When mounted on top of the bottom flange, the mechanical crimps 326 on the second retaining ring 321 may enter and extend through slots (e.g., slots 410 shown in FIG. 4) in the second locking ring. In this case, the bottom flange may be held tightly between the second locking ring and second retaining ring 321, due to a locking action of the mechanical crimps retained in the slots on the second locking ring. The mechanical crimps 326 may be folded over the outer edges of the second locking ring and bottom flange to secure the subside module to the fuel tank. The next step in the crimping process includes transforming the outer elevated edge 308 and outer surface 304 of the second crimped opening 330 to form a flat circular surface 318 as shown in FIG. 3F. As an example, the flat circular surface 318 surrounding the second aperture 319, may extend to form a portion of the bottom internal wall of the fuel tank as disclosed further below with reference to FIG. 5.

In this way, the bottom flange of the sub-side module may be mounted to the second crimped opening 330, and secured to the bottom wall of the fuel tank using the locking ring mounted on top of the second retaining ring 321, with mechanical crimps 326 on the ring securing the bottom flange in place.

Turning to FIG. 5, an example saddle fuel tank 500 having a top portion 220 and bottom portion 226 is depicted. The top portion 220 may be joined to the bottom portion 226 along contact plane 216 to form an enclosed region inside the saddle fuel tank 500 that includes a primary chamber 102, an intermediate chamber 103 and a secondary chamber 104. As an example, the top portion 220 may be securely attached to the bottom portion 226 via a permanent weld placed along contact plane 216 after a main and sub-side module (e.g., main module 106 and sub-side module 108 shown in FIG. 2) have been installed inside the saddle fuel tank 500. In another example, the top portion 220 may be securely fastened to the bottom portion 226 using other suitable methods. As an example, a body forming the top and bottom portion of the saddle fuel tank 500 may be comprised of stainless steel. In other examples, the saddle fuel tank 500 may be comprised of other suitable materials such as a single layer or multi-layer high-density polyethylene (HDPE), and low carbon steel. The saddle fuel tank 500 may be provided on a vehicle system, such as vehicle system 100 shown in FIG. 1, and may be adapted to store gasoline, diesel or other fuel blends dispensed from a fuel dispensing system.

As shown in FIG. 5, the saddle fuel tank 500 may include the primary chamber 102, intermediate chamber 103 and secondary chamber 104, with a recessed portion 203 separating the primary chamber 102 from the secondary chamber 104. The recessed portion 203 may form an elevated section having an inner surface 506 and outer surfaces 510. As an example, the saddle fuel tank 500 may be mounted in the vehicle, such that the recessed portion 203 fits over a transmission shaft or an exhaust pipe.

A first crimped opening 502 formed on the top external wall 201 of the primary chamber 102, may have an outer surface 304 to secure a top flange of a main module (such as top flange 202 of main module 106 in FIG. 2) to the saddle fuel tank 500. As an example, the top flange may be mounted to the first crimped opening 502 such that an interior section of the top flange couples to a top end of the main module, which is disposed inside the saddle fuel tank and extended through a first aperture 307 formed through the top wall 201. Subsequently, a first retaining ring 311 with mechanical crimps 316, is mounted in a first pocket 306 of the first crimped opening 502. The top flange may be mounted inside an opening 307 in a first retaining ring 311, and a first locking ring (e.g., locking ring 400 shown in FIG. 4) may be placed over the top flange. When mounted on a top surface of the top flange, the mechanical crimps 316 on the first retaining ring 311 may extend through slots (e.g., slots 410 shown in FIG. 4) in the first locking ring. In this case, the top flange may be held tightly between the first locking ring and first retaining ring 311, due to a locking action of the mechanical crimps 316 retained in the slots on the first locking ring. The mechanical crimps 316 on the first retaining ring 311 may be folded over the outer edges of the first locking ring and top flange to secure the main module to the fuel tank. When mounted to the saddle fuel tank 500, the main module may include a primary fuel pump, fuel level sensor and other accessories. For example, the primary fuel pump attached to the main module, may convey fuel from the primary chamber 102 to fuel injectors for delivering fuel to a plurality of engine cylinders. In another example, the fuel level sensor mounted on the main module, may be used to determine a level of the fuel in the saddle fuel tank 500. In other examples, other accessories such as a temperature sensor, a fluid composition sensor may be attached to the main module to measure fuel temperature and fuel composition, respectively.

As shown in FIG. 5, a second crimped opening 504 formed on a bottom internal wall 209 of the secondary chamber 104 of the saddle fuel tank, may include a second pocket 336 and a second retaining ring 321 configured with a plurality of mechanical crimps 326. A sub-side module (such as sub-side module 108 shown in FIG. 2), may be mounted inside the secondary chamber 104, and coupled to the second crimped opening 504 of the saddle fuel tank 500. As an example, a bottom flange (such as bottom flange 212 shown in FIG. 2) of the sub-side module may be coupled to the second crimped opening 504 such that inner surfaces of the bottom flange may touch an inner circular rim 310 and inner surfaces of the mechanical crimps 326 on the second retaining ring 321. A second locking ring (e.g., locking ring 400 shown in FIG. 4), may be mounted on a top surface of the bottom flange, to secure the bottom flange to a bottom internal wall 209 of the fuel tank. As an example, the second locking ring may have a similar or different diameter compared to the first locking ring coupled to the first crimped opening 502. When mounted on top of the bottom flange, the mechanical crimps 326 on the second retaining ring 321 may enter and extend through slots (e.g., slots 410 shown in FIG. 4) in the second locking ring. In this case, the bottom flange may be held tightly between the second locking ring and second retaining ring 321, due to a locking action of the mechanical crimps retained in the slots on the second locking ring. The mechanical crimps 326 on the second retaining ring 321 may be folded over the outer edges of the second locking ring and bottom flange to secure the subside module to the fuel tank When coupled to the second crimped opening 504, the bottom flange may form an integral component of the sub-side module. In one example, a top portion of the bottom flange may be attached to a base region of one or more cylindrical tubes (such as vertical columns 210 shown in FIG. 2), housing a secondary fuel pump, fuel level sensor and other accessories. As an example, the secondary pump may be coupled to a flexible tube (such as flexible tube 114 shown in FIG. 2) that conveys fuel from the secondary chamber 104 to the main module in the primary chamber 102. Subsequently, the fuel is conveyed from the primary chamber 102 to engine cylinders via the primary fuel pump attached to the main module.

In this way, the saddle fuel tank 500 may comprise: a main module mounted inside a primary chamber 102, where a top end of the module is held by a top flange that fits into a first crimped opening 502 on a top external wall 201 of the fuel tank 500; and a sub-side module mounted inside a secondary chamber 104 with a second flange that fits into a crimped region on a bottom inside wall 209 of the secondary chamber 104 to secure the subside module, wherein the first crimped opening 502 includes an aperture 307 and a first circular retaining ring 311 disposed in a first pocket 306 formed in the first crimped opening 502; and the crimped region includes a recessed slot 319, a second circular retaining ring 321 disposed in a second pocket 336 formed in the crimped region.

Referring now to FIG. 6, an example method 600 is shown for forming crimped openings in a top and bottom wall of a saddle fuel tank disclosed with reference to FIGS. 2 and 5 using components disclosed with reference to FIGS. 3A-3F. A first crimped opening formed on the top external wall of the saddle fuel tank provides a means for attaching a main module (such as main module 106 shown in FIG. 2) to the saddle fuel tank. The main module may be mounted inside a first chamber (e.g., primary chamber 102 shown in FIG. 2) of the saddle fuel tank. Similarly, a second crimped opening may be formed on the bottom internal wall of the saddle fuel tank, to attach a sub-side module (e.g., sub-side module 108 at FIG. 2) to the saddle fuel tank. The sub-side module may be mounted inside a secondary chamber (e.g., secondary chamber 104 shown in FIG. 2) of the saddle fuel tank.

At 602, method 600 includes forming a tank bubble (e.g., tank bubble 301 shown in FIG. 3A) at selected locations on the top and bottom walls of the saddle fuel tank. For example, a first location on the top external wall in the first chamber of the saddle fuel tank may be selected as a location for a first tank bubble, which is subsequently transformed into the first crimped opening for the main module. Similarly, a second location on the bottom internal wall in the secondary chamber of the saddle fuel tank may be selected as a location for a second tank bubble that is subsequently transformed into the second crimped opening for the sub-side module. The first and second tank bubbles may be circular elevated discs having a top, middle and bottom circular surface as disclosed with reference to FIG. 3A. As an example, the first and second tank bubble may be extruded or drawn from the first and second location on the top and bottom walls, respectively of the saddle fuel tank.

At 604, method 600 includes piercing a central section of each of the first and second tank bubble at the first and second location, respectively on the saddle fuel tank. The first and second tank bubbles are pierced to form a first and second opening, respectively in the saddle fuel tank. The first opening is formed on the top external wall of the fuel tank by cutting out a central section of the first tank bubble to provide an aperture (e.g., aperture 307 shown in FIG. 3B) with a diameter larger than a middle portion (e.g., middle portion 204 shown in FIG. 2) of the main module, mounted inside the saddle fuel tank. This allows the middle section of the main module to be extended through the aperture from inside the saddle fuel tank, and couple to a top flange (e.g., top flange 202 shown in FIG. 2) of the main module. In contrast, the second opening in the bottom internal wall of the saddle fuel tank, is formed by pressing a central section of the second tank bubble downward to produce a recessed slot (e.g. slot 319 shown in FIG. 3D) having a flat central surface, such as flat surface 309, shown in FIG. 3D.

At 606, a first pocket (e.g., pocket 306 shown in FIG. 3B) is formed inside the first tank bubble at the first location of the saddle fuel tank. Similarly, a second pocket (e.g., pocket 336 shown in FIG. 3D) is formed inside the second tank bubble at the second location of the saddle fuel tank. Specifically, the first pocket at the saddle fuel tank may be formed by depressing and folding a middle portion surrounding the aperture to form the pockets. As an example, an inner rim surface (e.g., rim surface 310 shown in FIG. 3B) may define an outer edge of the aperture, while an inner elevated circular edge (e.g., elevated circular edge 312 shown in FIG. 3B) forms an inner circular boundary of the first pocket. An outer elevated circular edge (e.g., elevated circular edge 308 shown in FIG. 3B) delimits an outer circular boundary of the first pocket, which tapers off towards an outer edge (e.g., outer surface 304 shown in FIG. 3B) of the first crimped opening. Likewise, the second pocket on the saddle tank may be formed by depressing and folding a middle portion surrounding the recessed slot (e.g., slot 319 shown in FIG. 3D), to form the second pocket of the second crimped opening as disclosed at FIG. 3D. An outer region (e.g., outer surface 304 shown in FIG. 3F) and portions of the second pocket of the second crimped opening may be transformed to form a flat circular surface, such as circular surface 318 shown in FIG. 3F, of the crimped opening. As an example, the flat circular surface surrounding the second crimped opening, may be extended to form a portion of the bottom internal wall of the saddle fuel tank as disclosed in FIG. 5. Each of the first and second pocket on the saddle fuel tank may have similar features, for example. In other examples, the first and second pocket formed on the top and bottom walls, respectively of the saddle fuel tank, may be sized with different diameters.

At 608, a first and second circular retaining ring, each ring having a plurality of mechanical crimps may be mounted in the first and second pocket, respectively of the saddle fuel tank. As an example, the first and second circular retaining rings, may be mounted inside each of the first and second pocket, respectively with a curved top portion of the mechanical crimps on each retaining ring pointing inward towards the center of the aperture or recessed portion as shown in FIGS. 3C-3F. In one example, the mechanical crimps on the first and second retaining ring may be upward extending crimps with the curved top portion. In further examples, a first retaining ring having a plurality of equally spaced mechanical crimps may be disposed in the first pocket of the first crimped opening, and a second retaining ring having similar features as the first retaining ring, may be disposed in the second pocket of the second crimped opening. The first and second retaining ring may be essentially manufactured using a similar production process, for example. The circular retaining ring disposed in the first and second crimped opening may include a plurality of slots formed between each pair of mechanical crimps. In this way, the top flange of the main module and bottom flange of the sub-side module may be coupled to the first and second crimped opening, respectively with surfaces of each flange in face-sharing contact with the inner contact surfaces of each crimped opening to form a tight coupling. A first locking ring (such as locking 400 shown in FIG. 4), may be mounted on a top surface of the top flange, with the mechanical crimps on the first retaining ring locking to the first locking ring. In this case, the top flange may be held tightly between the first locking and retaining rings, due to a locking action of the mechanical crimps on the first retaining ring. Similarly, a second locking ring, similar or different from the first locking ring, may be mounted on top of the bottom flange, with the mechanical crimps on the second retaining ring coupling to the second locking ring. The bottom flange may be secured tightly between the second locking and retaining rings, due to coupling of the mechanical crimps on the second retaining ring with the second locking ring.

At 610, the method 600 includes installing the main module in the first crimped opening, in the first chamber of the saddle fuel tank, and coupling the sub-side module to the second crimped opening in the secondary chamber. The main module may be mounted inside the first chamber, with a top portion of the main module extending through the aperture formed in the first crimped opening. Subsequently, the top flange may be coupled to a top portion of the main module, such that the middle section of the main module is held in the aperture of the first crimped opening. The next step involves folding over the mechanical crimps to secure the top flange. Further, an outer annular cap may be mounted over the top flange to close the first crimped opening on the top external wall of the saddle fuel tank.

The sub-side module may be mounted inside the second crimped opening formed on the bottom internal wall of the saddle fuel tank by inserting the bottom flange into the recessed slot forming the crimped opening. When mounted, the bottom flange touches the inner rim surface and bottom surface of the recessed slot, and the mechanical crimps on the second retaining ring are folded over the outer edges of the second locking ring and bottom flange to secure the sub-side module to the fuel tank. After installing the bottom flange, other components of the sub-side module such as vertical cylindrical housing containing a fuel pump and other accessories may be coupled to the bottom flange, and the saddle fuel tank may be permanently sealed by welding a contact interface (e.g., contact interface 216 shown in FIG. 5) between an upper and lower portions, such as top portion 220 and bottom portion 226 of the saddle fuel tank 500, shown in FIG. 5. Alternatively, the upper and lower portions of the saddle fuel tank may be fastened together using other suitable methods. The method 600 proceeds to exit.

In this way, the main module and sub-side module may be securely mounted to the first and second crimped openings, respectively of saddle fuel tank. The main module may be mounted inside the primary chamber of the saddle fuel tank and securely coupled to the first crimped opening using mechanical crimps on the first retaining ring coupled to the first locking ring. Similarly, the sub-side module may be mounted inside the secondary chamber of the saddle fuel tank, and securely coupled to the second crimped opening using mechanical crimps on the second retaining ring coupled to the second locking ring.

In one example, a saddle fuel tank comprises: a main module mounted inside a first chamber, where a top end of the module is held by a flange that fits into a crimped opening on a top external wall of the fuel tank; and a sub-side module mounted inside a secondary chamber with a flange that fits into a crimped region on a bottom inside wall of the secondary chamber to secure the subside module. In the preceding example additionally or optionally, the crimped region on the bottom inside wall is positioned at the bottom inside wall at a position where there is no opening in the bottom inside wall. In any or all of the preceding examples, additionally or optionally, the main module includes a fuel pump.

Furthermore, in any or all of the preceding examples, additionally or optionally, the first chamber is one side of the saddle fuel tank and the second chamber is distinct from the first chamber and is an opposite side of the saddle fuel tank. In any or all of the preceding examples, additionally or optionally, the crimped opening includes an aperture and a first circular retaining ring disposed in a first pocket formed in the crimped opening; the first retaining ring having a plurality of equally spaced mechanical crimps, each mechanical crimp configured with a vertical upward lower portion and a curved top portion.

In other examples, additionally or optionally, the sub-side module includes a fuel pump, fuel sensor and filter. In any or all of the preceding examples, additionally or optionally, the first chamber is fluidly coupled to the second chamber via a fuel tubing having an inlet mounted on the sub-side module, and an outlet coupled to the main module. In any or all of the preceding examples, additionally or optionally, the fuel tubing delivers fuel from the second chamber into the first chamber using one or more pressurized fuel pumps. In any or all of the preceding examples, additionally or optionally, fuel is delivered into the saddle fuel tank via a fuel line having an outlet in the secondary chamber and an inlet positioned outside the fuel tank.

FIGS. 1-4 show example configurations with relative positioning of the various components of the saddle fuel tank. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A saddle fuel tank comprising:
   a main module mounted inside a first chamber, where a top end of the module includes a flange that is positioned within a crimped opening on an external side of a top wall of the saddle fuel tank; and
   a sub-side module mounted inside a secondary chamber, the sub-side module including a flange that is positioned within a crimped region on an internal side of a bottom wall of the secondary chamber to secure the sub-side module.

2. The saddle fuel tank of claim 1, wherein the crimped region on the bottom wall is positioned at the bottom wall at a position where there is no opening in the bottom wall.

3. The saddle fuel tank of claim 1, wherein the main module includes a fuel pump.

4. The saddle fuel tank of claim 1, wherein the first chamber is one side of the saddle fuel tank and the second chamber is distinct from the first chamber and is an opposite side of the saddle fuel tank.

5. The saddle fuel tank of claim 1, wherein the crimped opening includes an aperture and a first circular retaining ring disposed in a first pocket formed in the crimped opening, the first circular retaining ring having a plurality of equally spaced mechanical crimps, each mechanical crimp configured with a vertical upward lower portion and a curved top portion.

6. The saddle fuel tank of claim 5, wherein the crimped region includes a recessed slot, a second circular retaining ring disposed in a second pocket formed in the crimped region, the second circular retaining ring having a plurality of equally spaced mechanical crimps, each mechanical crimp configured with a vertical upward lower portion and a curved top portion.

7. The saddle fuel tank of claim 1, wherein the sub-side module includes a fuel pump, a fuel sensor, and a filter.

8. The saddle fuel tank of claim 1, wherein the first chamber is fluidly coupled to the second chamber via a fuel tubing having an inlet mounted on the sub-side module and an outlet coupled to the main module.

9. The saddle fuel tank of claim 8, wherein the fuel tubing delivers fuel from the second chamber into the first chamber using one or more pressurized fuel pumps.

10. The saddle fuel tank of claim 1, wherein fuel is delivered into the saddle fuel tank via a fuel line having an outlet in the secondary chamber and an inlet positioned outside the saddle fuel tank.

11. A saddle fuel tank comprising:
    a main module mounted inside a first chamber, where a top end of the module includes a flange that is positioned within a crimped opening on an external side of a top external wall of the saddle fuel tank; and
    a sub-side module mounted inside a secondary chamber including a flange that is positioned within a crimped region on an internal side of a bottom wall of the secondary chamber to secure the sub-side module, wherein the crimped opening includes an aperture and a first circular retaining ring disposed in a first pocket formed in the crimped opening, and the crimped region includes a recessed slot and a second circular retaining ring disposed in a second pocket formed in the crimped region.

12. The saddle fuel tank of claim 11, wherein the crimped region on the bottom wall is positioned at the bottom wall at a position where there is no opening in the bottom wall.

13. The saddle fuel tank of claim 11, wherein the first chamber is one side of the saddle fuel tank and the second chamber is distinct from the first chamber and is an opposite side of the saddle fuel tank.

14. The saddle fuel tank of claim 13, wherein the first circular retaining ring includes a plurality of equally spaced mechanical crimps, each mechanical crimp configured with a vertical upward lower portion and a curved top portion.

15. The saddle fuel tank of claim 14, wherein the second circular retaining ring includes a plurality of equally spaced mechanical crimps, each mechanical crimp configured with a vertical upward lower portion and a curved top portion.

16. The saddle fuel tank of claim 15, wherein the sub-side module includes a fuel pump, a fuel sensor, and a filter.

17. The saddle fuel tank of claim 16, wherein the first chamber is fluidly coupled to the second chamber via a fuel tubing having an inlet mounted on the sub-side module and an outlet coupled to the main module.

18. The saddle fuel tank of claim 11, wherein fuel is delivered into the saddle fuel tank via a fuel line having an outlet in the secondary chamber and an inlet positioned outside the saddle fuel tank.

19. A method of manufacturing a saddle fuel tank, including:
    crimping a first retaining ring positioned in a pocket of an external side of a top surface of the saddle fuel tank shaped to fit with a flange on a top end of a main module; and
    crimping a second retaining ring position in a pocket of an internal side of a bottom surface of the saddle fuel tank shaped to fit with a flange on a bottom end of a sub-side module.

20. The saddle fuel tank of claim 12, further including a bottom locking ring positioned so that the flange of the sub-side module is positioned between the bottom locking ring and the crimped region.

* * * * *